(12) United States Patent
Hansen

(10) Patent No.: US 6,810,671 B2
(45) Date of Patent: Nov. 2, 2004

(54) METHOD FOR THE FUEL SUPPLY AND A FUEL SUPPLY SYSTEM FOR AIRCRAFT EQUIPPED WITH AT LEAST ONE AERO GAS TURBINE

(75) Inventor: Volker Hansen, Reichenwalde (DE)

(73) Assignee: Rolls-Royce Deutschland Ltd & Co KG, Dahlewitz (DE)

( * ) Notice: Subject to any disclaimer, the term of this patent is extended or adjusted under 35 U.S.C. 154(b) by 0 days.

(21) Appl. No.: 10/161,698

(22) Filed: Jun. 5, 2002

(65) Prior Publication Data
US 2002/0192082 A1 Dec. 19, 2002

(30) Foreign Application Priority Data
Jun. 5, 2001 (DE) .......................... 101 27 196

(51) Int. Cl.⁷ .............. F04B 25/00; F04B 49/00
(52) U.S. Cl. ............... 60/734; 417/244; 417/251; 417/300
(58) Field of Search ............... 417/251, 244, 417/300, 426; 60/734, 39.281, 39.094; 123/514; 137/563, 565.34

(56) References Cited

U.S. PATENT DOCUMENTS

| | | | |
|---|---|---|---|
| 3,774,394 A | * 11/1973 | Criffield | 60/39.091 |
| 4,073,136 A | 2/1978 | Symon | 60/39.28 R |
| 4,550,561 A | 11/1985 | Coffinberry | |
| 4,899,535 A | * 2/1990 | Dehan et al. | 30/39.08 |
| 5,152,146 A | * 10/1992 | Butler | 60/736 |
| 5,495,715 A | * 3/1996 | Loxley | 417/223 |
| 6,112,725 A | * 9/2000 | McKinney | 123/509 |
| 6,135,090 A | * 10/2000 | Kawachi et al. | 123/446 |
| 6,142,120 A | * 11/2000 | Biester et al. | 123/456 |
| 6,230,688 B1 | * 5/2001 | Faix et al. | 123/495 |
| 6,237,573 B1 | * 5/2001 | Onishi et al. | 123/506 |
| 6,487,847 B1 | 12/2002 | Snow et al. | |
| 2002/0129598 A1 | * 9/2002 | Taga | |

FOREIGN PATENT DOCUMENTS

| | | |
|---|---|---|
| DE | 2640362 | 3/1977 |
| EP | 1143128 | 10/2001 |
| GB | 763448 | 12/1956 |
| GB | 912762 | 12/1962 |
| WO | 9207179 | 4/1992 |
| WO | 92/07179 | 4/1992 |

* cited by examiner

Primary Examiner—Charles G. Freay
(74) Attorney, Agent, or Firm—Harbin King & Klima

(57) ABSTRACT

The invention relates to a method for the fuel supply of an aero gas turbine installed in an aircraft and to a fuel supply system. In order to avoid negative effects by out-gassed air in the fuel lines, the invention provides for an increased flow rate of the fuel in the fuel lines and for a fuel return line (6) for the return of excess fuel to the tank.

26 Claims, 1 Drawing Sheet

METHOD FOR THE FUEL SUPPLY AND A FUEL SUPPLY SYSTEM FOR AIRCRAFT EQUIPPED WITH AT LEAST ONE AERO GAS TURBINE

BACKGROUND OF THE INVENTION

This invention relates to a method for the fuel supply and a fuel supply system for aircraft equipped with at least one aero gas turbine.

The fuel supply systems of aircraft are provided with suction delivery systems besides the aircraft-side tank boost pumps. These systems remain operative even in the event of a total failure of the aircraft electrical power supply, i.e. in a situation in which the tank boost pumps are no longer available. In the fuel supply systems according to the state-of-the-art, jet pumps are used with aero gas-turbine propulsion systems in order to increase the suction delivery capacity, these pumps removing the out-gassed air present in the fuel system from the aircraft-side fuel supply system. Out-gassing of the air is due to the pressure decrease in suction operation, among others.

The ejector jet of such a suction pump is normally supplied by the engine-side low-pressure fuel pump. Here, the out-gassed air in the fuel line is sucked by the jet pump, mixed with the ejector jet to form small bubbles and then fed into the inlet of the low-pressure fuel pump. These small bubbles—evenly distributed in the fuel—enhance the suction delivery capacity of the pump impeller. It should be noted, that complete separation of air and fuel into two phases is shifted towards higher flight altitudes.

A disadvantage of the previous systems lies in the fact that the performance of these jet pump systems, which are used to increase the suction delivery capacity in turbine propulsion systems, is limited, this circumstance being due to operational dependence of these systems on the delivery capacity of the low-pressure fuel pump. As the delivery pressure of the low-pressure fuel pump is varying in an irregular way in suction operation at higher flight altitudes, the suction capacity of the jet pump inevitably decreases until a point is reached at which no fuel is sucked at all.

A further disadvantage is the heating of the fuel in the low-pressure fuel pump. This heating results from the losses occurring in the fuel circulation of the jet pump ejector jet supply around the pump. The resultant heat inevitably increases the vapor pressure of the fuel. Accordingly, the boiling range of the fuel is reached at relatively low flight altitudes.

In order to avoid the above-mentioned problems, the diameters of the state-of-the-art fuel supply lines to the engine are selected as large as possible, thereby providing for minimal line pressure losses. Consequently, with the pressure being decreased, out-gassing of the air dissolved in the fuel can be minimized in suction operation. A major disadvantage of this approach lies in the fact that the large line diameters involve low flow rates. As a consequence, the out-gassed air accumulates at the line high-points, for example in the main landing gear bay, and is not carried away with the fuel. Consequently, this air cannot be managed by the engine-side jet pump and, in extreme cases, will fill the aircraft-side fuel supply line over its entire length. This is particularly critical for stern-powered aircraft, where the entire air quantity may abruptly move to the engine and cause the delivery flow of the engine-side low-pressure fuel pump to collapse, for example when the aircraft nose is pulled down for descent. This will result in flame-out of the combustion chamber and, consequently, in blow-out and run-down of the engine.

A broad aspect of the present invention is to provide a method and a system for fuel supply which ensures the safe fuel supply of aero gas turbines while avoiding the disadvantages of the state-of-the-art.

It is a particular object of the present invention to provide remedy to the above problems by the features cited in the independent claims, with further objects and advantages becoming apparent from the sub-claims.

SUMMARY OF THE INVENTION

Accordingly, the present invention provides for an increased flow rate in the fuel line to the engine. This results in considerable advantages. Although the increased flow rate inevitably involves higher flow losses, the inlet conditions at the engine actually are improved. In contrast to the situation known in the state-of-the-art, in which the engine-side low-pressure fuel pump would practically be overwhelmed by a sudden, large quantity of air, the increase of the flow rate as provided by the present invention enables the air to be delivered continually and in manageable quantities to the low-pressure fuel pump and, subsequently, to be further compressed in the high-pressure system. Thus, undesired accumulations of large quantities of out-gassed air are safely avoidable.

In accordance with the present invention, the flow rate is adaptable to the aircraft-side fuel line geometry in terms of both the resultant pressure decrease and the adequate flow velocity, thereby ensuring an appropriate fuel supply throughout the altitude range (sea level to maximum flight altitude).

In accordance with the present invention, a particularly advantageous method to increase the flow rate in the aircraft-side fuel supply lines is to increase the fuel mass flow beyond the normal engine demand. For this purpose, the present invention provides for a circulation system which returns the excess fuel from the engine to the tank. This characteristic is easily achieved since modern engines (aero gas turbines) have a pump capacity which is more than sufficient to cater for this additional mass flow. The large pump capacity results from the fact that the "windmilling start" is often used as the controlling operating point in pump design, i.e. when the engine is started while driven by the air stream. Here, the engine high-pressure pump is required to provide a relatively high pressure at correspondingly low rotational speed, which results in a considerable over-capacity of the pump for all other operating points. The circulation system in accordance with the present invention can, therefore, be easily combined with the usual aero gas turbines.

In accordance with the present invention, the circulation system may be designed such that it taps the fuel circulation flow either downstream of the low-pressure turbine or down-stream of the high-pressure turbine. Both approaches will similarly increase the fuel mass flow in the aircraft-side fuel supply lines, while having different consequences on the thermal situation of the engine. The fuel temperature downstream of the low-pressure pump is usually only slightly higher than the tank temperature, whereas the fuel temperature on the high-pressure side may well be beyond 100° C. due to the heat input from the oil cooler and the high-pressure pump. Which of these approaches is actually applied depends essentially on the overall configuration of the engine/aircraft fuel system. The advantages according to the present design exist in both approaches.

In order to demonstrate the functioning of the method and the system according to the present invention, a scale set-up of the aircraft-side and the engine-side fuel system was made on a test stand, using genuine lines and accessories from a Boeing 717-200 aircraft and genuine BR715 engines. On the test stand, the following climb suction altitude limits were obtained with JET A fuel:

| | |
|---|---|
| No recirculation | 34.000 ft |
| Recirculation from the low-pressure side | 53.000 ft |
| Recirculation from the high-pressure side | 49.000 ft. |

In a subsequent test with a Boeing 717-200, the following climb suction altitude limits were obtained with JET A fuel:

| | |
|---|---|
| No recirculation | 33.000 ft |
| Recirculation from the high-pressure side | 37.000 ft. |

The climb suction altitude limit on the test aircraft, which is lower than that on the test stand, does not constitute a physical limit since higher flight altitudes were not tested. The test stand results, therefore, demonstrate the significant power reserves in the suction altitude limit of the test aircraft in connection with the fuel supply system according to the present invention. In order to demonstrate the stability of the engine operation, the flight tests included dynamic maneuvers, such as banking turns and negative acceleration.

The advantages as provided by the present invention also exist with highly volatile fuel grades, such as JP-4. Here, the suction altitude limit in climb increased from 23.500 ft to 27.000 ft, the suction altitude limit at constant altitude from 25.000 ft to even 37.000 ft.

BRIEF DESCRIPTION OF THE DRAWINGS

The present invention is more fully described in the light of the accompanying drawing showing two embodiments. On the drawing.

DETAILED DESCRIPTION OF THE INVENTION

Figure 1:
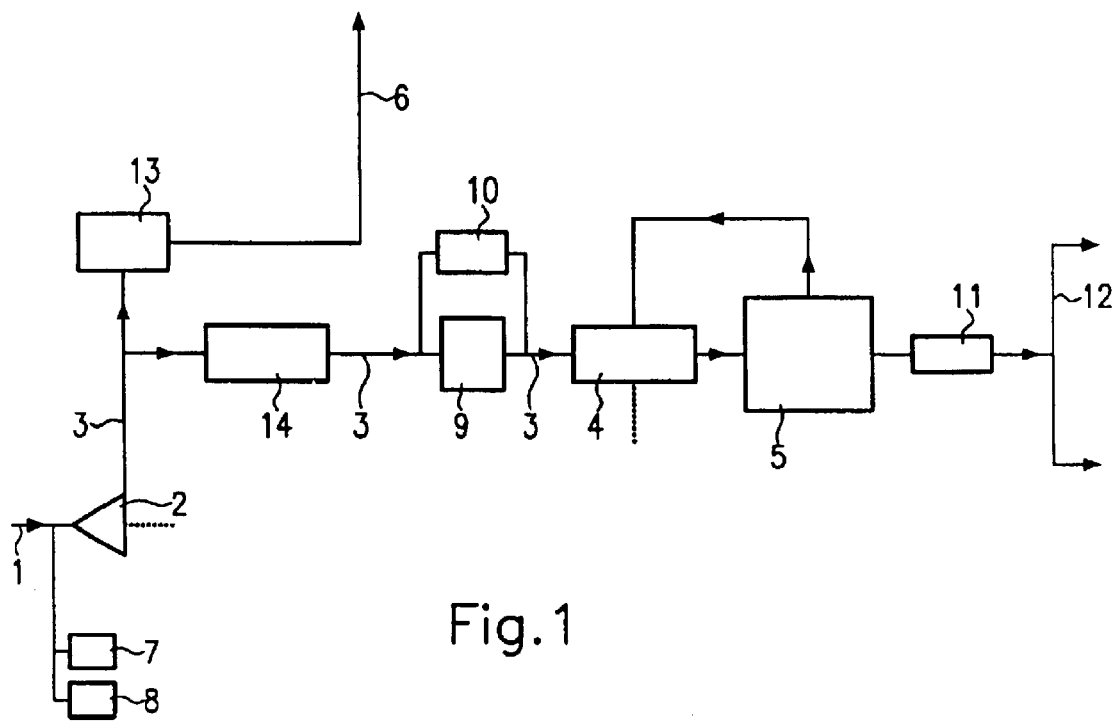
FIG. 1 is a schematic view of the fuel supply system with recirculation flow from the high-pressure side, and FIG. 2 a view similar to FIG. 1 with recirculation flow from the low-pressure side.

FIG. 1 shows in schematic representation a first embodiment of the fuel supply system in accordance with the present invention. Fuel is supplied to a low-pressure pump by way of a first fuel line 1. This low-pressure pump is driven by the gearbox. Pressure switches 7, 8 are provided at the inlet of the low-pressure pump.

The low-pressure pump is connected to a high-pressure pump 4 via a second fuel line 3. In the second fuel line 3, a filter 9 (LP filter) is provided to which a pressure-operated switch 10 is associated in parallel arrangement.

A fuel metering unit 5 is arranged downstream of the high-pressure pump 4. Subsequent to the fuel metering unit 5, a flowmeter 11 is provided after which the fuel line branches into the various lines of the burner manifold 12.

In the embodiment shown in FIG. 1, a recirculation valve 13 (FRTT valve) is connected to the second fuel line 3. In turn, this recirculation valve (FRTT valve) 13 connects to a fuel return line 6. Via this line, excess fuel may recirculate into a tank, this tank not being shown.

Figure 2:
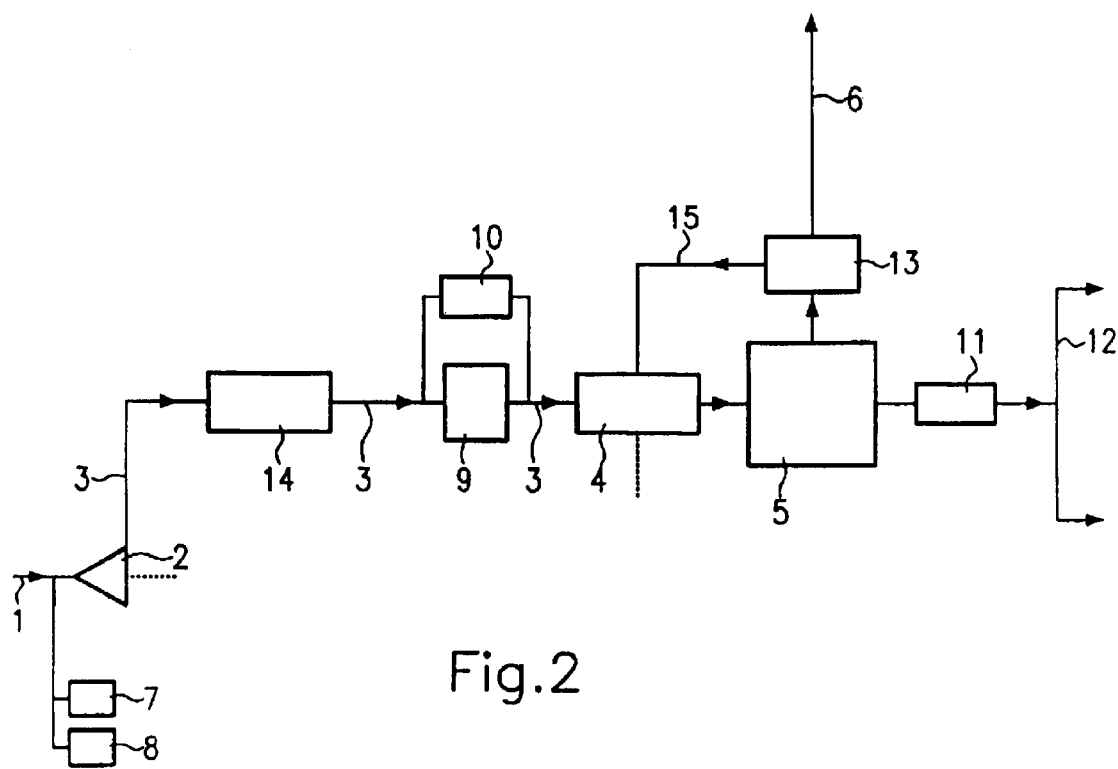

The embodiment shown in FIG. 2 differs in that the recirculation valve (FRTT valve) is arranged downstream of the high-pressure pump 4. Additionally, a return line 15 (spill return flow) from the recirculation valve 13 to the high-pressure pump 4 is provided in this arrangement.

In both embodiments, the reference numeral 14 indicates an engine heat exchanger.

Both the low-pressure pump 2 and the high-pressure-pump 4 are driven by the gearbox.

In the embodiments shown in FIGS. 1 and 2, circulation of excess fuel through the recirculation valve 13 and fuel return line 6 to return such excess fuel to the fuel tank will immediately be activated if the two pressure switches 7, 8 detect a low pressure indicative of a suction delivery situation in the first fuel line 4 connecting the tank to the inlet of the low-pressure pump 2 and signal such a suction delivery situation. An orifice in the recirculation valve 13 controls the excess fuel return flow to the desired value based on the signals from the nressure switches 7 and 8.

The embodiment shown in FIG. 2, in which the recirculation flow is taken off downstream of both the low-pressure pump 2 and the high-pressure pump 4 is particularly advantageous if heating of the fuel is not desirable. Furthermore, existing aircraft piping may be utilized, this enabling the installation costs to be reduced accordingly.

A plurality of modifications may be made to the embodiments here shown without detracting from the inventive concept.

| List of reference numerals: | |
|---|---|
| 1 | First fuel line |
| 2 | Low-pressure pump |
| 3 | Second fuel line |
| 4 | High-pressure pump |
| 5 | Fuel metering unit |
| 6 | Fuel return line |
| 7 | Pressure switch |
| 8 | Pressure switch |
| 9 | Low-pressure filter |
| 10 | Pressure-operated switch |
| 11 | Flowmeter |
| 12 | Burner manifold |
| 13 | Recirculation (FRTT) valve |
| 14 | Heat exchanger |
| 15 | Return (spill return flow) line |

What is claimed is:

1. A fuel supply system for an aircraft equipped with at least one gas turbine engine and at least at least one fuel tank, comprising:
   a low pressure pump;
   a first fuel line connecting the fuel tank to the low-pressure pump from the fuel tank to the low-pressure pump;
   a high pressure pump;
   a second fuel line connecting the high-pressure pump to the low-pressure pump downstream of the low-pressure pump for supplying fuel from the low-pressure pump to the high-pressure pump;
   a fuel return line connected downstream of at least one of the low-pressure pump and the high-pressure pump for returning excess fuel to the fuel tank;
   a recirculation valve connected to the fuel return line for controlling flow of the excess fuel to the fuel tank; and a pressure signal device connected to the first fuel line, for detecting a low pressure situation in the first fuel line and signaling the recirculation valve to increase flow of excess fuel to the fuel tank in response thereto.

2. The fuel supply system of claim 1, wherein the first and second fuel lines are small in diameter to achieve high flow rates.

3. The fuel supply system of claim 2, wherein the fuel return line is connected downstream of the high-pressure pump.

4. The fuel supply system of claim 3, and further comprising:

a fuel metering unit connected to the high-pressure pump downstream of the high-pressure pump for metering fuel to the engine from the high-pressure pump, wherein the fuel return line is connected to the fuel metering unit.

5. The fuel supply system of claim 1, wherein the fuel return line is connected to the second fuel line.

6. The fuel supply system of claim 2, wherein the fuel return line is connected to the second fuel line.

7. The fuel supply system of claim 1, wherein the fuel return line is connected downstream of the high-pressure pump.

8. The fuel supply system of claim 7, and further comprising:

a fuel metering unit connected to the high-pressure pump downstream of the high-pressure pump for metering fuel to the engine from the high-pressure pump, wherein the fuel return line is connected to the fuel metering unit.

9. The fuel supply system of claim 1, wherein the low pressure situation is a suction delivery situation.

10. The fuel supply system of claim 1, wherein the suction delivery situation results in an undesirable level of out-gassing of air from the fuel in the first fuel line.

11. The fuel supply system of claim 1, wherein the recirculation valve is in a closed state to prevent flow of excess fuel through the fuel return line when the low pressure situation is not being signaled by the pressure signal device.

12. The fuel supply system of claim 11, wherein the recirculation valve is in an open state to allow flow of excess fuel through the fuel return line when the low pressure situation is being signaled by the pressure signal device.

13. The fuel supply system of claim 1, wherein the pressure signal device is a pressure switch.

14. The fuel supply system of claim 1, and comprising a second pressure signal device connected to the first fuel line for detecting a low pressure situation in the first fuel line and signaling the recirculation valve to increase flow of excess fuel to the fuel tank in response thereto.

15. A method for supply fuel to a gas turbine engine installed in an aircraft having a fuel supply system with at least one fuel tank, comprising:

supplying fuel from the fuel tank through a first fuel line to a low-pressure pump;

supplying the fuel from the low-pressure pump through a second fuel line to a high-pressure pump;

transporting the fuel through the fuel lines in a quantity exceeding a fuel requirement of the engine;

returning excess fuel exceeding the fuel requirement of the engine to the fuel tank through a fuel return line;

detecting a low pressure situation in the first fuel line; and increasing flow of the excess fuel to the fuel tank in response to the detection of a low pressure situation.

16. The method of claim 15, wherein the excess fuel is returned to the fuel tank from the second fuel line.

17. The method of claim 15, wherein the excess fuel is returned to the fuel tank from a portion of the fuel supply system downstream of the high-pressure pump.

18. The method of claim 17, wherein the excess fuel is returned to the fuel tank from a fuel metering unit downstream of the high-pressure pump.

19. The method of claim 15, and further comprising increasing flow of the excess fuel to the fuel tank with a recirculation valve connected to the fuel return line.

20. The method of claim 19, and further comprising closing the recirculation valve to reduce flow of excess fuel through the fuel return line when the low pressure situation is not being detected.

21. The method of claim 15, and further comprising detecting the low pressure situation in the first fuel line with a pressure signal device connected to the first fuel line.

22. The method of claim 15, and further comprising signaling the recirculation valve to increase flow of excess fuel to the fuel tank with the pressure signal device.

23. The method of claim 15, and wherein the low pressure situation is a suction delivery situation.

24. The method of claim 23, wherein the suction delivery situation results in an undesirable level of out-gassing of air from the fuel in the first fuel line.

25. The method of claim 15, and further comprising preventing flow of excess fuel through the fuel return line when the low pressure situation is not being detected.

26. The method of claim 15, and further comprising detecting the low pressure situation at a second point in the first fuel line.

* * * * *